United States Patent
Sharma et al.

(10) Patent No.: US 11,010,205 B2
(45) Date of Patent: May 18, 2021

(54) VIRTUAL NETWORK FUNCTION RESOURCE ALLOCATION

(71) Applicant: HEWLETT PACKARD ENTERPRISE DEVELOPMENT LP, Houston, TX (US)

(72) Inventors: Puneet Sharma, Palo Alto, CA (US); Lianjie Cao, Palo Alto, CA (US); Vinay Saxena, Richardson, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 350 days.

(21) Appl. No.: 15/608,248

(22) Filed: May 30, 2017

(65) Prior Publication Data

US 2018/0349202 A1 Dec. 6, 2018

(51) Int. Cl.
| | |
|---|---|
| *G06F 15/173* | (2006.01) |
| *G06F 9/50* | (2006.01) |
| *H04L 12/24* | (2006.01) |
| *H04L 12/725* | (2013.01) |
| *H04L 12/911* | (2013.01) |

(Continued)

(52) U.S. Cl.
CPC .......... *G06F 9/5077* (2013.01); *G06F 9/5061* (2013.01); *H04L 41/0896* (2013.01); *H04L 45/30* (2013.01); *H04L 47/827* (2013.01); *G06F 9/45533* (2013.01); *G06F 9/45558* (2013.01); *H04L 45/586* (2013.01); *H04L 67/1002* (2013.01)

(58) Field of Classification Search
CPC .. G06F 9/5077; G06F 9/45533; G06F 9/5061; G06F 2009/45595; G06F 8/61; G06F 9/45558; H04L 41/0896; H04L 12/4641; H04L 45/30; H04L 45/586; H04L 47/827; H04L 67/10; H04L 41/0806; H04L 41/0816; H04L 47/00; H04L 67/1002; H04L 67/1004
USPC ................................ 709/208, 223, 225, 226
See application file for complete search history.

(56) References Cited

U.S. PATENT DOCUMENTS

| | | | |
|---|---|---|---|
| 9,122,552 B2 * | 9/2015 | Whitney | ................... G06F 8/61 |
| 9,667,509 B1 * | 5/2017 | Levi | ....................... H04L 47/80 |

(Continued)

FOREIGN PATENT DOCUMENTS

WO    WO-2017029097 A1    2/2017

OTHER PUBLICATIONS

Gardikis, G. et al., "An Integrating Framework for Efficient NFV Monitoring", ResearchGate, DOI: 10.1109/NETSOFT.2016.7502431, Jun. 11, 2016, 6 pages.

(Continued)

*Primary Examiner* — Dustin Nguyen
*Assistant Examiner* — Hao H Nguyen
(74) *Attorney, Agent, or Firm* — Hewlett Packard Enterprise Patent Department

(57) ABSTRACT

Examples allocating resources to virtual network functions (VNFs). Some examples include monitoring information associated with a set of VNFs that includes a set of VNF instances. A resource allocation event may be predicted for a VNF instance based on the monitored information and a resource flexing model that is developed using a capacity metric of the VNF instance. A resource flexing plan may be generated based on the resource allocation event and an order of the set of VNFs in a service function chain.

17 Claims, 8 Drawing Sheets

(51) Int. Cl.
    *H04L 12/713*  (2013.01)
    *G06F 9/455*   (2018.01)
    *H04L 29/08*   (2006.01)

(56) References Cited

U.S. PATENT DOCUMENTS

| | | | |
|---|---|---|---|
| 9,794,187 B1* | 10/2017 | Felstaine | G06F 9/45558 |
| 9,961,675 B1* | 5/2018 | Reed | H04W 72/0406 |
| 2015/0281006 A1* | 10/2015 | Kasturi | H04L 47/00 709/208 |
| 2015/0381423 A1* | 12/2015 | Xiang | G06F 9/5077 709/223 |
| 2016/0337202 A1* | 11/2016 | Ben-Itzhak | H04L 41/5051 |
| 2017/0093721 A1* | 3/2017 | Kano | H04L 67/1038 |
| 2017/0126792 A1* | 5/2017 | Halpern | G06F 9/5061 |
| 2018/0027060 A1* | 1/2018 | Metsch | G06F 3/0613 709/226 |
| 2018/0165114 A1* | 6/2018 | Nishijima | G06F 9/45533 |
| 2018/0205666 A1* | 7/2018 | Nash | H04L 67/10 |
| 2018/0241630 A1* | 8/2018 | Andrianov | H04L 41/0806 |
| 2019/0075062 A1* | 3/2019 | Brookshire | G06F 9/505 |
| 2019/0132211 A1* | 5/2019 | Yeung | H04L 41/0896 |
| 2019/0207827 A1* | 7/2019 | Tavernier | H04L 41/5019 |
| 2020/0028749 A1* | 1/2020 | Dhandu | H04L 12/4641 |

OTHER PUBLICATIONS

Margolin, U. et al., "Using Machine Learning to Detect Noisy Neighbors in 5G Networks", (Research Paper), Oct. 24, 2016, 4 pages.
Rankothge, W. et al., "Towards Making Network Function Virtualization A Cloud Computing Service", (Research Paper), 2015, 8 pages.
Shi, R. et al., "MDP and Machine Learning-based Cost-optimization of Dynamic Resource Allocation for Network Function Virtualization", (Research Paper), International Conference on Services Computing Jun. 27, 2015 pp. 65-73.
Szabo, R. et al., "Elastic Network Functions Opportunities And Challenges", (Research Paper), 2015, pp. 1-11.
Amazon, "AWS Auto Scaling", available online at <https://aws.amazon.com/autoscaling/>, 8 pages.
Anwer et al., "Programming Slick Network Functions", SOSR '15 Proceedings of the 1st ACM SIGCOMM Symposium on Software Defined Networking Research, Article No. 14, Jun. 2015, 13 pages.
Bremler-Barr et al., "OpenBox: A Software-Defined Framework for Developing, Deploying, and Managing Network Functions", In SIGCOMM '16 Proceedings of the 2016 ACM SIGCOMM Conference Aug. 2016, pp. 511-524.
Cao et al., "NFV-VITAL: A Framework for Characterizing the Performance of Virtual Network Functions", In Proceeding of the 1st IEEE Conference on Network Function Virtualization & Software Defined Networks, San Francisco, (2015), 7 pages.
European Search Report and Search Opinion Received for EP Application No. 18172987.2, dated Oct. 31, 2018, 11 pages.
Gember et al., "Stratos: A Network-Aware Orchestration Layer for Middleboxes in the Cloud", Technical Report arXiv:1305.0209, 2013, 14 pages.
Gember-Jacobson et al., "OpenNF: Enabling Innovation in Network Function Control", Proceedings of the 2014 ACM conference on SIGCOMM, Aug. 2014, 14 pages.
Gong et al., "PRESS: PRedictive Elastic ReSource Scaling for Cloud Systems", International Conference on Network and Service Management, Oct. 2010, 8 pages.
OpenStack, "Heat", available online at <https://wiki.openstack.org/wiki/Heat>, 5 pages.
OPNFV, "Promise project", available online at <https://wiki.opnfv.org/>, 3 pages.
Palkar et al., "E2: A Framework for NFV Applications", Proceedings of the 25th Symposium on Operating Systems Principles, 2015, pp. 121-136.
Palkar et al., "E2: A Runtime Framework for Network Functions", In ACM SOSP '15 Proceedings of the 25th Symposium on Operating Systems Principles, Oct. 2015, pp. 121-136.
Shen et al., "CloudScale: Elastic Resource Scaling for Multi-Tenant Cloud Systems", Proceedings of the 2nd ACM Symposium on Cloud Computing Article No. 5, 14 pages.
Vasic et al., "DejaVu: Accelerating Resource Allocation in Virtualized Environments", In ASPLOS XVII Proceedings of the seventeenth international conference on Architectural Support for Programming Languages and Operating Systems, Mar. 2012, pp. 423-436.

* cited by examiner

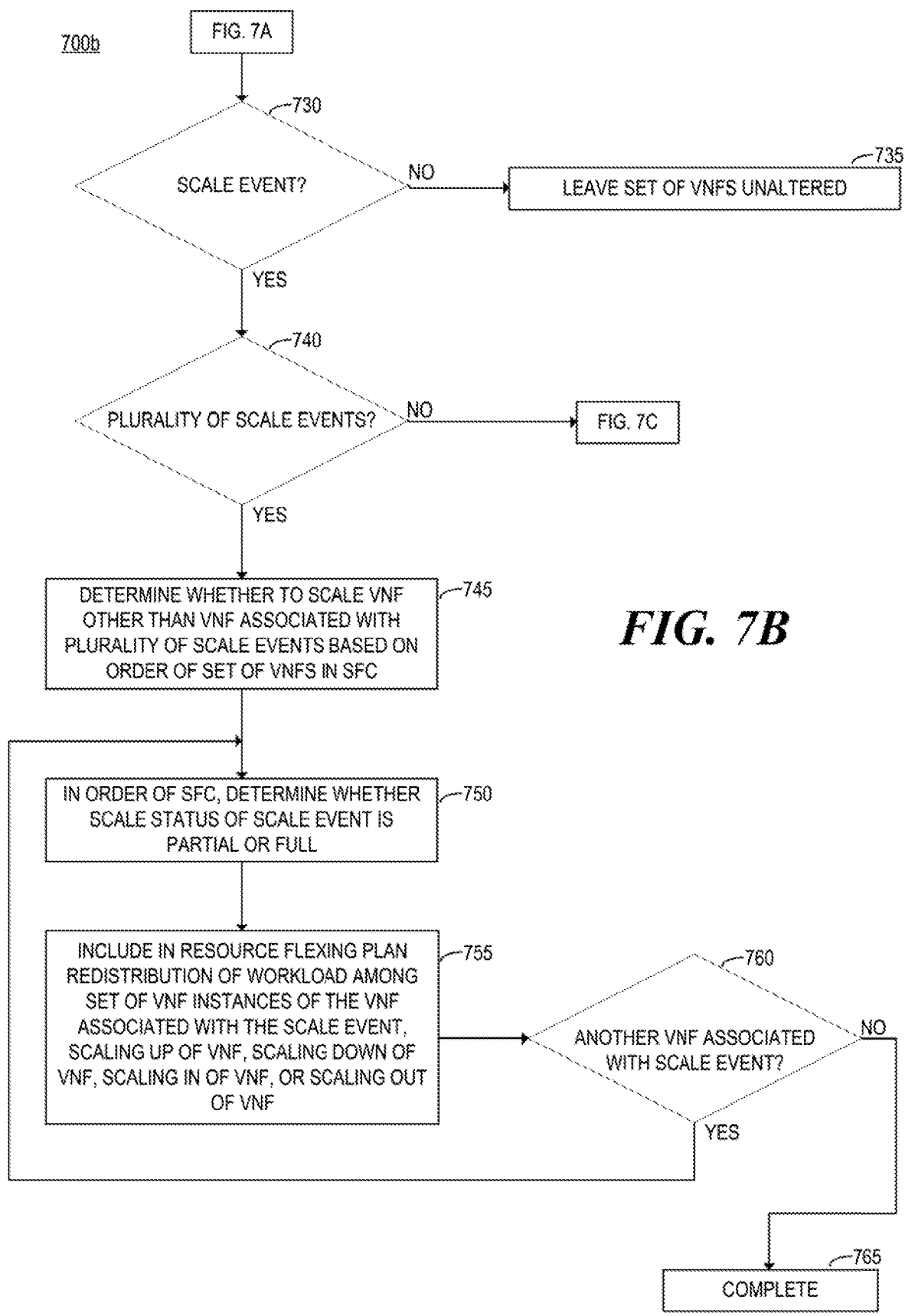

VIRTUAL NETWORK FUNCTION RESOURCE ALLOCATION

BACKGROUND

Network Function Virtualization (NFV) virtualizes network services as virtual network functions (VNFs). NFV attempts to bring agility to network function deployment and leverage elastic scaling to reduce operational expenses. As an example, VNFs may be deployed on commodity compute, storage, and networking resources to reduce operational expenses and provide greater flexibility. VNFs may be chained in a particular order in a service function chain (SFC) in order of network traffic traversal and may be elastically scaled, as needed. In some examples, each VNF may be elastically scaled.

BRIEF DESCRIPTION OF THE DRAWINGS

The following detailed description references the drawings, wherein:

FIGS. 7A-7C are flowcharts of example methods to generate a resource flexing plan.

DETAILED DESCRIPTION

Figure 1:
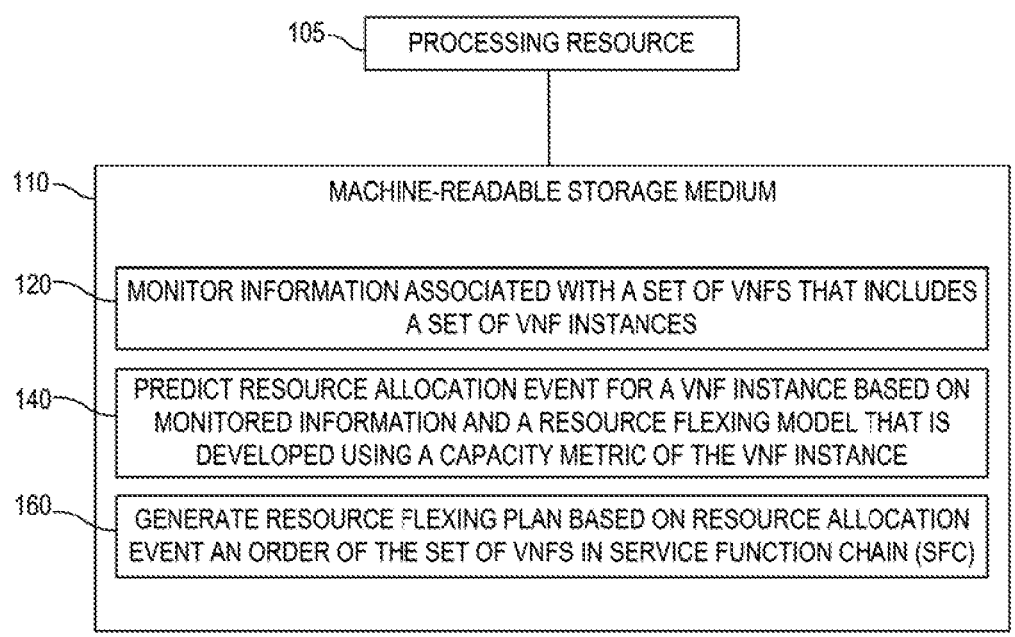
FIGS. 1 and 2 are block diagrams of example machine-readable storage mediums including instructions to allocate resources to a set of virtual network functions (VNFs)

Network Function Virtualization (NFV) replaces dedicated network appliances with virtualized network functions via Virtual Network Functions (VNFs). Ideally, NFV dynamically and elastically allocates resources to VNFs to meet varying workload demands such that overall capital expenses (CAPEX) and operational expenses (OPEX) are reduced. However, workload heterogeneity, complex relationships between resources allocated to VNFs, and the resultant capacity of various VNFs make elastic resource flexing a challenging task. For instance, scaling a VNF too early may be costly and result in inefficient resource utilization. Alternatively, scaling a VNF too late may result in service disruption and/or service quality violations.

Effective VNF scaling and prediction mechanisms may be complicated by several different factors. First, unlike hardware implementations, VNFs vendors may not provide detailed capacity and performance specifications. This is in part because VNF capacity and performance depend on an underlying NFV infrastructure, VNF resource sizing, and workload dynamics. Second, VNFs have distinct processing logic on incident network traffic and events. Thus, even if some VNFs share similar packet processing functionalities, the differences in upper-layer processing logic and implementation can exhibit unique resource usage patterns. Third, the dynamics of network traffic in volume and composition may trigger different processing units underlying the same VNF and hence consume different amounts of resources. Lastly, network traffic, which constitutes the VNF workload, is forwarded through VNFs based on a policy graph as laid out in a service function chain leading to dependencies in VNF resource adjustment.

VNF resource management systems may fail to take into consideration each of these factors. In some examples, NFV infrastructure metrics may be collected to make scaling decisions. In other examples, various VNF metrics may also be collected to make scaling decisions. Nevertheless, such examples may fail to consider a workload capacity of each VNF instance in conjunction with NFV infrastructure-specific metrics and VNF-specific metrics in predicting whether a VNF may become overloaded. In addition, such examples may also fail to consider dependence relationships amongst VNFs, for instance, their order in a service function chain, in scaling a VNF.

Examples described herein may improve resource allocation to VNFs within a NFV deployment via monitoring of NFV infrastructure-specific metrics and VNF-specific metrics. For instance, some examples described herein, may predict a resource allocation event based on the monitored information and a resource flexing model that is developed using a capacity metric and generate a resource flexing plan that takes into account an order of the set of VNFs within a service function chain.

In some examples described herein, a processing resource may execute instructions on a machine-readable storage medium to allocate resources to a set of virtual network functions (VNFs). The machine-readable storage medium may comprise instructions to monitor information associated with the set of VNFs that includes a set of VNF instances, predict a resource allocation event for a VNF instance based on the monitored information and a resource flexing model that is developed using a capacity metric of the VNF instance, and generate a resource flexing plan based on the resource allocation event and an order of the set of VNFs in a service function chain.

In some such examples, the information may include network function virtualization (NFV) infrastructure-specific metrics such as central processing unit (CPU) usage, memory usage, network usage, and virtualization system-related metrics. The information may also include VNF-specific metrics such as transaction rate, request rate, processing delay and queue sizes. The VNF-specific metrics may be different for different VNFs. In other such examples, the resource flexing model may be developed (i.e., trained) offline via a machine-learning technique that uses training data as well as a capacity metric for each VNF instance. The capacity metric may indicate a predetermined workload at which the VNF instance provides stable service. The resource flexing model may be updated during online operation based on monitored information.

In some examples described herein, a system to allocate resources to a VNF may comprise a VNF monitor engine to monitor information associated with a VNF, the information including NFV infrastructure-specific metrics and VNF-specific metrics. The system may also include a scaling decision engine to predict a resource allocation event for the VNF instance based on the monitored information and a resource flexing model, the resource flexing model being developed offline via a machine-learning technique using training data and a capacity metric for the VNF instance. A resource flexing engine of the system may also generate a resource flexing plan based on the resource allocation event.

In some examples described herein, a method of allocating resources to a set of VNFs may involve developing a set of resource flexing models offline via a machine-learning technique using training data and a capacity metric, the set of resource flexing models including an associated resource flexing model for each VNF of the set of VNFs. The method may further involve monitoring information associated with the set of VNFs, each VNF of the set of VNFs including a set of VNF instances and the information including network function virtualization (NFV) infrastructure-specific metrics and VNF-specific metrics. Based on the monitored information and the set of resource flexing models, a resource allocation event may be predicted for each VNF instance such that a set of resource allocation events includes the resource allocation event for each VNF instance. Based on the resource allocation event for each VNF instance and based on an order of a VNF of the set of VNFs in a service function chain, a resource flexing plan may be generated and converted to executable commands for enforcement by a NFV orchestrator.

The terminology used herein is for the purpose of describing particular examples only and is not intended to be limiting. As used herein, the singular forms "a," "an," and "the" are intended to include the plural forms as well, unless the context clearly indicates otherwise. A "set," as used herein, includes one or multiple items. The term "plurality," as used herein, is defined as two or more than two. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. In examples described herein, a determination, action, etc., that is said to be "based on" a given condition may be based on that condition alone or based on that condition and other condition(s). Likewise, a determination, action, etc., that is said to be "in response to" a given condition may be in response to that condition alone or in response to that condition and other condition(s).

Referring now to the drawings, FIG. 1 is a block diagram of an example machine-readable storage medium 110 that includes instructions to allocate resources to a set of virtual network functions (VNFs). The instructions are executable by a processing resource 105.

Machine-readable storage medium 110 comprises (e.g., is encoded with) instructions 120, 140, and 160 executable by processing resource 105 to implement functionalities described herein in relation to FIG. 1. In some examples, storage medium 110 may include additional instructions. In other examples, the functionalities described herein in relation to instructions 120, 140, 160, and any additional instructions described herein in relation to storage medium 110, may be implemented at least in part in electronic circuitry (e.g., via components comprising any combination of hardware and programming to implement the functionalities described herein).

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 105 may fetch, decode, and execute instructions stored on storage medium 110 to perform the functionalities described above in relation to instructions 120, 140, and 160. In other examples, the functionalities of any of the instructions of storage medium 120 may be implemented in the form of engines, such as those in FIGS. 4 and 5, in the form of electronic circuitry, in the form of executable instructions encoded on a machine-readable storage medium, or a combination thereof. In the example of FIG. 1, storage medium 110 may be implemented by one machine-readable storage medium, or multiple machine-readable storage media.

Instructions 120 of FIG. 1 monitor information associated with a set of VNFs that includes a set of VNF instances. A VNF, as used herein, refers to a virtualized network function or task that may be otherwise carried out by a dedicated hardware appliance. The VNF may perform a specific network service such as a firewall, intrusion detection and protection system, load balancer, network address translator, caching proxy, and the like. In some examples, VNFs may be hosted on a virtual machine, container, or other virtualization mechanism.

Network Function Virtualization (NFV) virtualizes network services via VNFs. A VNF may include a VNF instance. As used herein, a VNF instance is an instantiation of the VNF. A NFV orchestrator might create and deploy multiple instances of a VNF to meet the demands of the incident workload. A VNF instance may be run independently or as a collaborative module that communicates with other VNF instances to complete a network service task together. In some examples, each VNF includes a set of VNF instances. VNFs may be connected or sequenced in a particular order based (at least in part) on network traffic traversal. As used herein, a service function chain, refers to such a sequence of VNFs. The relationships between a service function chain may be described in a policy graph. In some examples, this policy graph may be reduced to a directed acyclic graph.

In some examples, instructions 120 may monitor NFV infrastructure-specific metrics. These metrics may include information about central processing unit (CPU) usage, memory usage, network usage, and virtualization-related metrics, for instance, container-specific or virtual machine-specific information. Instructions 120 may also monitor VNF-specific metrics such as transaction rate, request rate, processing delay and queue sizes. Different metrics may be monitored for different VNFs. The information may also include heuristic information, such as that workloads at different VNFs increase or decrease at certain hours of the day. The NFV-infrastructure specific metrics, VNF-specific metrics, heuristic information, and the like allow instructions 120 to monitor an incident workload of the VNF or VNF instance.

In some examples, instructions 120 may monitor the information by querying a VNF or VNF instance to collect VNF-specific and NFV infrastructure-specific information at every time interval T. In some such examples, VNF log files or VNF application program interfaces (API) that report metrics may be queried for such information. Instructions 120 may collect and store the information. For instance, in some examples, instructions 120 may convert and store all metric values and information in a key-value format.

Instructions 140 predict a resource allocation event for a VNF instance based (at least in part) on the monitored information and a resource flexing model that is developed using a capacity metric of the VNF instance. A resource flexing model, as used herein, refers to an analytic model used to predict an overload of a VNF instance. The resource flexing model may be developed (i.e., trained) using a capacity metric for each VNF instance. The capacity metric may be a predetermined maximum workload at which the VNF instance provides stable service. In other examples, the capacity metric may be a predetermined minimum workload below which the workload should not be decreased or a target workload above which the workload should not be increased. The capacity metric may be determined during an offline test.

In some examples, instructions 140 may pull or receive the monitored information from instructions 120 to predict a resource allocation event. For example, instructions 140 may pull the monitored information every W=nT, where W refers to a time window, T refers to a time interval at which the information is monitored, and n is a suitable integer that balances an interest in efficiently scaling VNFs against unnecessary changes and overreaction. Instructions 140 may use the information to determine an incident workload of the VNF and predict the resource allocation event by determining a proximity of the incident workload of the VNF to the capacity metric of the VNF.

A resource allocation event, as used herein, refers to a scaling prediction for a VNF instance. In some examples, the resource allocation event may indicate an urgent scale event, a scale event, or a no scale event. An urgent scale event, as used herein, refers to a current overload or failure of the VNF instance. In such examples, the resource flexing model may have failed to predict the overload prior to its occurrence. A scale event, as used herein, refers to a VNF instance that is approaching an overload or failure or that is severely underutilized. In some such examples, the VNF instance may be approaching its capacity. In some such examples, the VNF instance may be underutilized if it is approaching or exceeds a minimum utilization. In yet other examples, the resource flexing model may predict that traffic at a VNF instance will increase or decrease based (at least in part) on heuristic information, resulting in the scale event. A no scale event, as used herein, refers to a VNF instance that is not overloaded, in failure, approaching overload or failure, underutilized, or approaching underutilization. In some examples, a VNF instance that is at a certain percentage below its capacity may be considered a VNF instance that need not be scaled. Likewise, a VNF instance that is at a certain percentage above its minimum utilization may be considered a VNF instance that need not be scaled.

Instructions 160 generate a resource flexing plan based (at least in part) on the resource allocation event and an order of the set of VNFs in a service function chain. A resource flexing plan may indicate whether and how a VNF should be scaled, resources should be allocated, and/or a workload should be distributed. For instance, based (at least in part) on the resource allocation event, the resource flexing plan may leave the set of VNFs unaltered, redistribute workload among a set of VNF instances of a VNF, allocate more or fewer resources to a VNF (i.e., scale out or in), and/or add or remove a number of VNF instances from a VNF (i.e., scale up or down).

The resource flexing plan may take into consideration an order of the set of VNFs in a service function chain. For instance, if a VNF instance later in the service function chain is overloaded or is becoming overloaded, the resource flexing plan may evaluate VNF dependency relationships to adjust or scale VNFs earlier in the service function chain to mitigate any latency due to preceding VNFs, avoid service quality violations, and/or minimize repeated adjustment of VNFs.

In some examples, instructions 120, 140, and 160 may be part of an installation package that, when installed, may be executed by processing resource 105 to implement the functionalities described above. In such examples, storage medium 110 may be a portable medium, such as a CD, DVD, or flash drive, or a memory maintained by a server from which the installation package can be downloaded and installed. In other examples, instructions 120, 140, and 160 may be part of an application, applications, or component(s) already installed on a device including processing resource 110. In such examples, the storage medium 110 may include memory such as a hard drive, solid state drive, or the like. In some examples, functionalities described herein in relation to FIG. 1 may be provided in combination with functionalities described herein in relation to any of FIGS. 2-7C.

Figure 2:
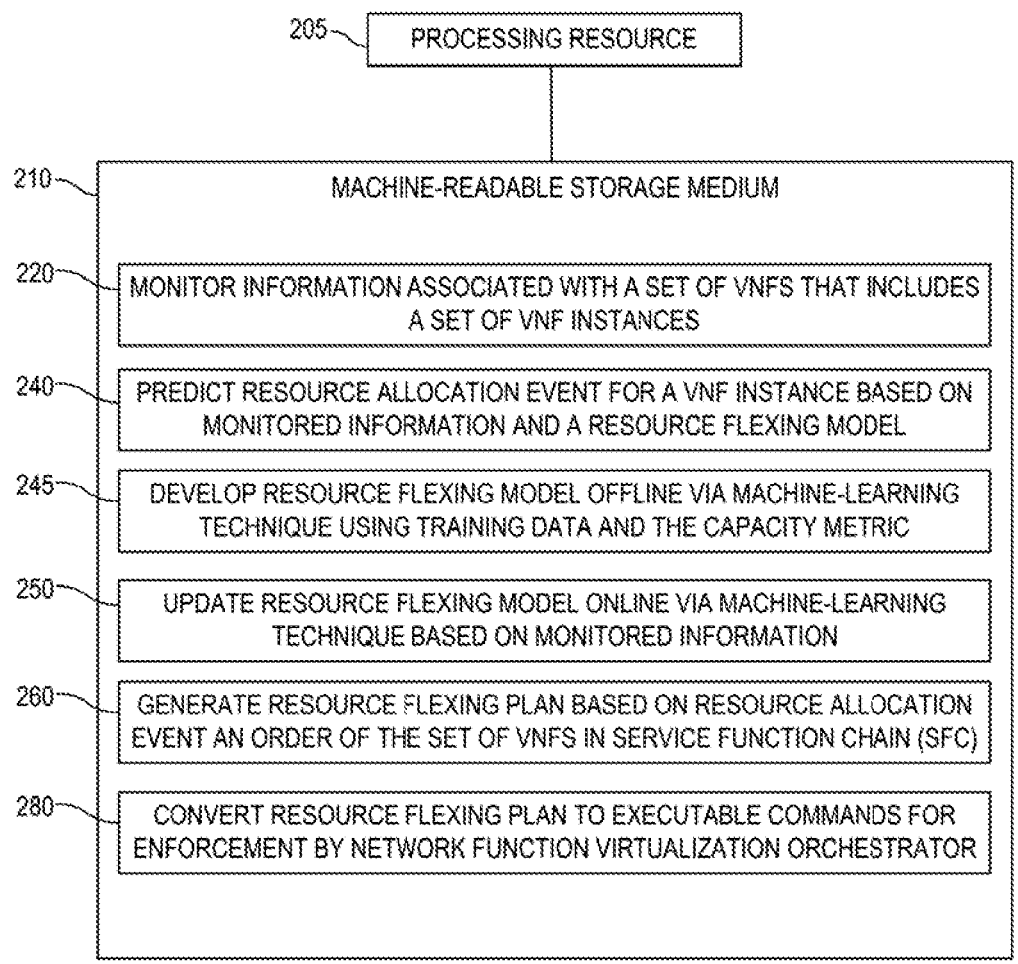

Further examples are described herein in relation to FIG. 2, which is a block diagram of an example machine-readable storage medium 210 that includes instructions executable by a processing resource 205 to allocate resources to a set of VNFs. Machine-readable storage medium 210 comprises (e.g., is encoded with) instructions 220, 240, 245, 250, 260, and 280 executable by processing resource 205 to implement functionalities described herein in relation to FIG. 2. The functionalities described herein in relation to instructions 220, 240, 245, 250, 260, 280, and any additional instructions described herein in relation to storage medium 210, are implemented at least in part in electronic circuitry (e.g., via any combination of hardware and programming to implement functionalities, as described below).

Instructions 220 may monitor information associated with a set of VNFs that includes a set of VNF instances, as described above in relation to instructions 120 of FIG. 1. In some such examples, each VNF may include a set of VNF instances. Instructions 240 may predict a resource allocation event for a VNF instance based (at least in part) on the monitored information and a resource flexing model. In some examples, a resource allocation event may be predicted for each VNF instance of the set of VNF instances. In other examples, a resource allocation event may be predicted for each VNF instance of a subset or subgroup of VNF instances. In such examples, the resource allocation event for each VNF instance may make up a set of resource allocation events.

Instructions 240 may generate a 2D scale array with vectors indicating which instances of a VNF should be adjusted. In such an example, an urgent scale event, a scale event, and a do not scale event may all be represented by different vector values. Instructions 240 may push such an array to instructions 260, which generate the resource flexing plan.

Instructions 240 may use a separate resource flexing model for each VNF of the set of VNFs or each VNF instance of the set of VNF instances to predict the resource allocation event for the VNF instance. In the example of FIG. 2, instructions 245 may develop a resource flexing model offline via machine-learning techniques using training data and the capacity metric. The training data may be synthetic workload data or data that is collected from running a VNF in a real time environment. The training data may include NFV infrastructure-specific metrics and VNF-specific metrics. In some examples, the training data may also include heuristic information gleaned from a real time environment.

An offline training phase may involve conducting a series of training experiments that cover as many different types of workloads as possible. Each data point for a time window W may be labeled as "scale" or "do not scale" to train the resource flexing model when to predict a scale event or a do not scale event. In one example, for each type of workload, the workload generation rate may be gradually increased until the VNF reaches maximum capacity (e.g., the capacity metric). Then, random workload generation rates may be used that are smaller than the maximum capacity to collect data to train and test the resource flexing model. Once offline training results in a resource flexing model having a certain accuracy and confidence specific, the model is stored for online use. The resource flexing model may be a machine-learning model such as a decision tree, random forest, logistic regression, Lasso and naïve Bayes, a neural network model, and the like. A separate resource flexing model may be generated for each VNF of the set of VNFs or each VNF instance of the set of VNF instances based (at least in part) on a capacity metric specific to each VNF instance or VNF and training data.

In some examples, the resource flexing model may be periodically retrained offline. Alternatively, the resource flexing model may be retrained offline in response to an event such as a major software update or changes in underlying hardware. The resource flexing model may also continue to be improved during online operation. Instructions 250 update the resource flexing model during online operation based (at least in part) on the monitored information collected during online operation. The resource flexing model may be periodically improved or improved based (at least in part) on a trigger. For instance, an urgent scale event, which indicates a failure of the resource flexing model to predict a scale event, may trigger an update to the model.

Instructions 260 generate a resource flexing plan based (at least in part) on the resource allocation event and an order of the set of VNFs in a service function chain, as described above in relation to instructions 160 of FIG. 1. In some examples, instructions 260 may receive a 2D scale array from instructions 240 from which it generates the resource flexing plan. Instructions 260 to generate the resource flexing plan may include instructions 361, 362, 363, 364, 365, 366, 367, 368, 369, and 370 of FIG. 3.

Figure 3:
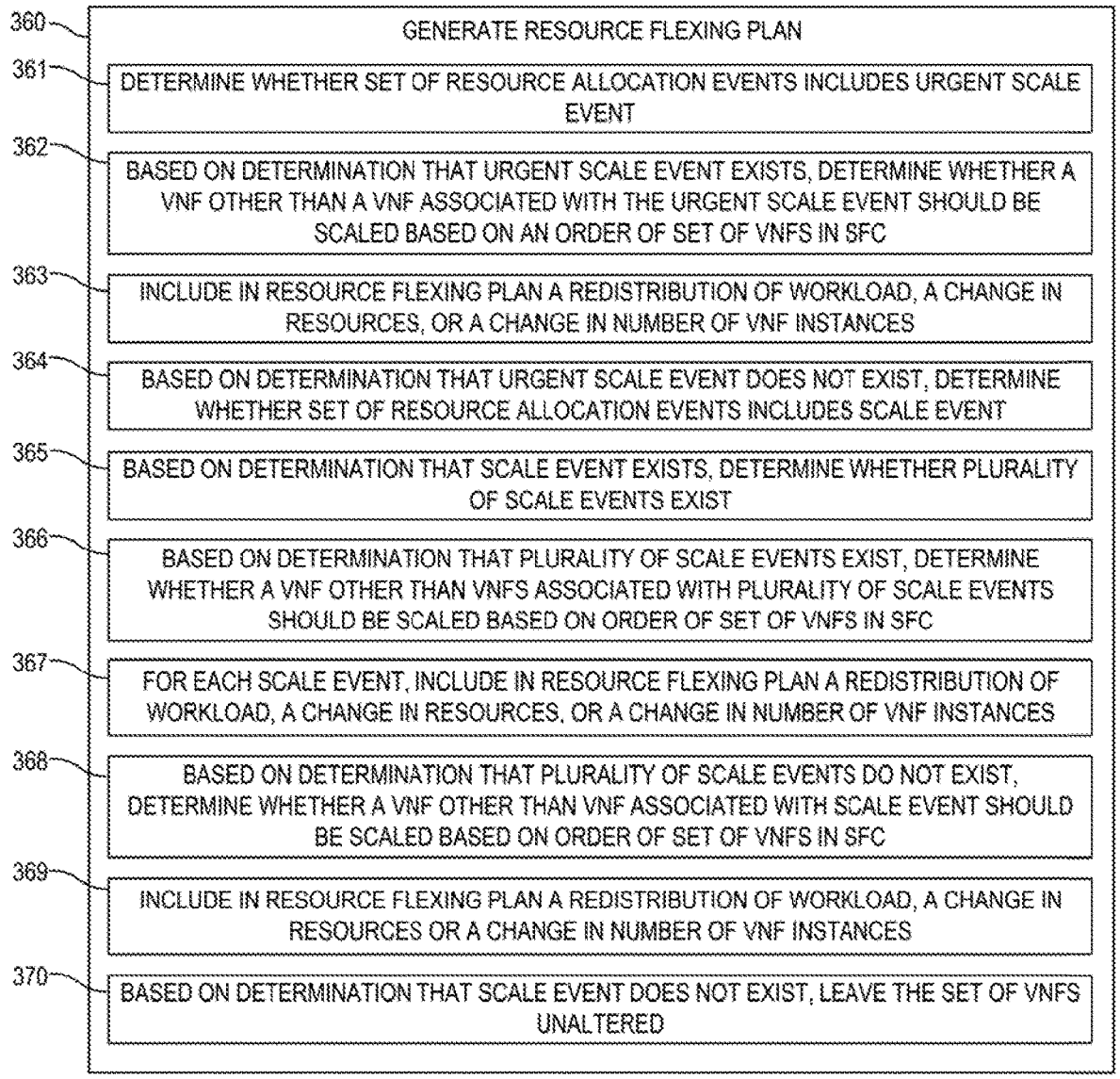
FIG. 3 is a block diagram of an example machine-readable storage medium including instructions to generate a resource flexing plan.

FIG. 3 is a block diagram of example instructions 360 to generate a resource flexing plan based (at least in part) on the resource allocation event and an order of the set of VNFs in a service function chain. Instructions 361 determine whether a set of resource allocation events includes an urgent scale event. In some examples, instructions 361 may make this determination by analyzing a 2D scale array. In other examples, a separate identifier may indicate which VNF instances are associated with an urgent scale event.

Based (at least in part) on a determination that an urgent scale event exists, instructions 362 determine whether a VNF other than a VNF associated with the urgent scale event should be scaled based (at least in part) on the order of the set of VNFs in the service function chain. For instance, instructions 362 may take into account whether the overloaded VNF is toward the beginning or the end of a service function chain to determine whether VNFs preceding it or after it should be adjusted or scaled. Any additional VNFs in the service function chain that should be adjusted or scaled will be included in the resource flexing plan. The resource flexing plan may also include an order in which VNFs should be adjusted or scaled.

Instructions 363 include in the resource flexing plan a redistribution of workload among a set of VNF instances of the VNF associated with the urgent scale event, a change in resources allocated to the VNF associated with the urgent scale event, or a change in a number of VNF instances of the VNF associated with the urgent scale event. In some examples, a redistribution of workload among the set of VNF instances of the VNF may involve rerouting network traffic from a VNF instance to other VNF instances. A change in resources allocated to the VNF may involve increasing processing or memory resources. And a change in a number of VNF instances may involve generating an additional VNF instance.

In some examples, an urgent scale event may be classified as having a partial scale status or a full scale status. The scale status may be determined by reviewing a predicted resource allocation event of each VNF instance of the VNF associated with the urgent scale event. A partial scale status indicates that a subset of the VNF instances of the VNF associated with the urgent scale are overloaded or in failure, but that some of the VNF instances have spare or residual capacity. A full scale status indicates that each VNF instance of the VNF associated with the urgent scale is overloaded or in failure and/or that none of the VNF instances have spare capacity.

In some examples, an event having a partial status may be treated differently from an event having a full status. For instance, an overload associated with a partial scale status may be alleviated by redistributing a workload among the VNF instances of the VNF associated with the urgent scale. In other examples, redistribution of the workload may be insufficient to alleviate the workload and a change in resources allocated to the VNF associated with the urgent scale event or a change in a number of VNF instances of the VNF associated with the urgent scale event may be needed. An overload associated with a full scale status may be alleviated by a change in resources allocated to the VNF associated with the urgent scale event or a change in a number of VNF instances of the VNF associated with the urgent scale event.

Based (at least in part) on a determination that an urgent scale event does not exist, instructions 364 determine whether the set of resource allocation events includes a scale event. In some examples, instructions 364 may make this determination by analyzing a 2D scale array. In other examples, a separate identifier may indicate which VNF instances are associated with a scale event.

Based (at least in part) on a determination that a scale event exists, instructions 365 determine whether a plurality of scale events exist. Based (at least in part) on a determination that a plurality of scale events exist, instructions 366 determine whether a VNF other than those associated with the plurality of scale events should be scaled based (at least in part) on the order of the set of VNFs in the service function chain. For instance, instructions 366 may take into account whether the VNFs associated with the scale events are toward the beginning or the end of a service function chain (e.g., in accordance with the SFC reduced to a directed acyclic graph) to determine an order in which the VNFs should be adjusted or scaled and to determine whether any preceding VNFs should also be adjusted or scaled. Any additional VNFs in the service function chain that should be adjusted or scaled will be included in the resource flexing plan. The resource flexing plan may also include an order which VNFs should be adjusted or scaled.

Instructions 367 include in the resource flexing plan, for each scale event, a redistribution of workload among a set of VNF instances of the VNF associated with the scale event, a change in resources allocated to the VNF associated with the scale event, or a change in a number of VNF instances of the VNF associated with the scale event. Redistribution of workload among the set of VNF instances of the VNF may involve rerouting network traffic from a VNF instance to other VNF instances. A change in resources allocated to the VNF may involve increasing or decreasing processing or memory resources. And a change in a number of VNF instances may involve generating an additional VNF instance or removing a VNF instance. In addition, as described above, in some examples, the scale event may be classified as having a partial scale status or a full scale status, which may affect how the VNF associated with the scale event is adjusted or scaled.

Based (at least in part) on a determination that a plurality of scale events do not exist, instructions 368 determine whether a VNF other than a VNF associated with the scale event should be scaled based (at least in part) on the order of the set of VNFs in the service function chain. For instance, instructions 368 may take into account whether the VNF associated with the scale event is toward the beginning or the end of a service function chain to determine whether any preceding or following VNFs should also be adjusted or scaled. Any additional VNFs in the service function chain that should be adjusted or scaled will be included in the resource flexing plan. The resource flexing plan may also include an order which VNFs should be adjusted or scaled.

Instructions 369 include in the resource flexing plan a redistribution of workload among a set of VNF instances of the VNF associated with the scale event, a change in resources allocated to the VNF associated with the scale event, or a change in a number of VNF instances of the VNF associated with the scale event. As described above, in some examples, the scale event may be classified as having a partial scale status or a full scale status, which may affect how the scale event is adjusted or scaled. Based (at least in part) on a determination that a scale event does not exist, instructions 370 leave the set of VNFs unaltered.

Referring again to FIG. 2, instructions 280 may convert the resource flexing plan to executable commands for enforcement by a NFV orchestrator. The plan may be converted to platform-dependent commands and may also determine placement of any new VNF instances to reduce costs and processing overhead.

In some examples, instructions 220, 240, 245, 250, 260, and 280 of FIG. 2, as well as instructions 361-370 of FIG. 3, may be part of an installation package that, when installed, may be executed by processing resource 205 to implement the functionalities described above. In such examples, storage medium 210 may be a portable medium, such as a CD, DVD, or flash drive, or a memory maintained by a server from which the installation package can be downloaded and installed. In other examples, instructions 220, 240, 245, 250, 260, and 280 of FIG. 2 and instructions 361-370 of FIG. 2 may be part of an application, applications, or component(s) already installed on a device including processing resource 210. In such examples, the storage medium 210 may include memory such as a hard drive, solid state drive, or the like. In some examples, functionalities described herein in relation to FIGS. 2 and 3 may be provided in combination with functionalities described herein in relation to any of FIGS. 1 and 4-7C.

Figure 4:
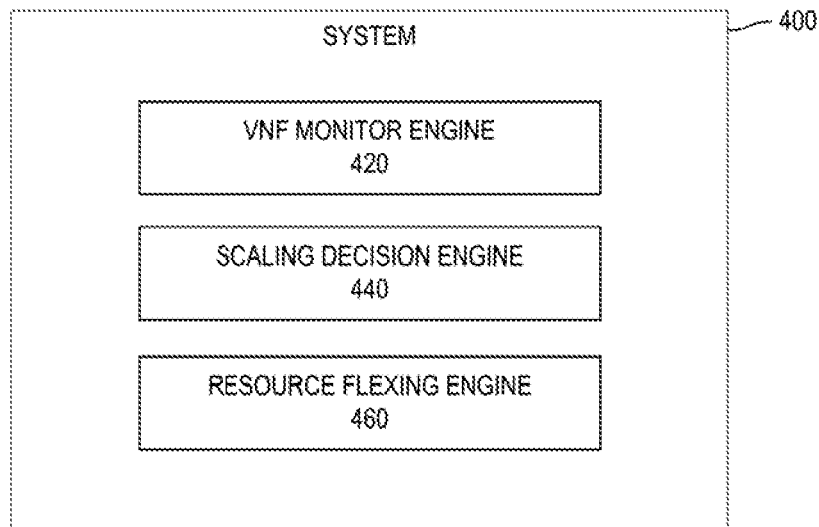
FIGS. 4 and 5 are block diagrams of example systems to allocate resources to a set of VNFs.
Figure 5:
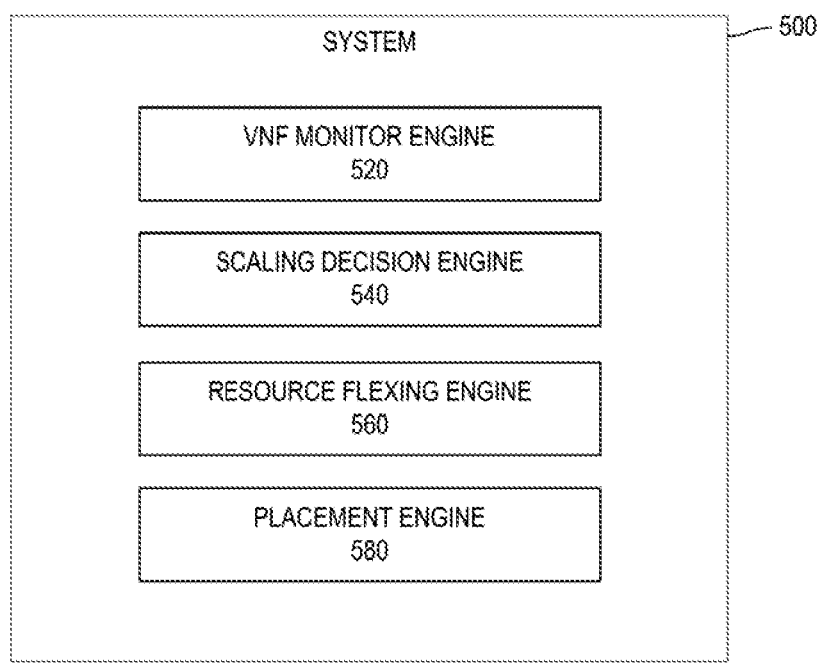

FIGS. 4 and 5 depict example systems 400 and 500, respectively, to allocate resources to a VNF. Engines 420, 440, and 460 of FIG. 4 and engines 520, 540, 560, and 580 of FIG. 5 may include any combination of hardware and programming to implement the functionalities of the engines described herein. In examples described herein, such combinations of hardware and software may be implemented in a number of different ways. For example, the programming for the engines may be processor executable instructions stored on a non-transitory machine-readable storage medium and the hardware for the engines may include a processing resource to execute those instructions, as described in FIGS. 1, 2, and 3. In some examples, the hardware may also include other electronic circuitry to at least partially implement at least one engine of the system. In some examples, the machine-readable storage medium may store instructions, such as instructions 120, 140, and 160 of FIG. 1 and instructions 220, 240, 245, 250, 260, and 280 of FIG. 2, that when executed by the processing resource, at least partially implement some or all engines of system 400 or system 500. In such examples, systems 400 or 500 may include the machine-readable storage medium storing the instructions and the processing resource to execute the instructions.

FIG. 4 depicts a system 400 that includes a VNF monitor engine 420, a scaling decision engine 440, and a resource flexing engine 460. Although system 400 is described below with reference to the instructions of FIGS. 1 and 2, system 400 is not limited to such examples. Each engine may be a decoupled module that leverages commonly adopted NFV architecture from the European Telecommunications Standards Institute (ETSI).

VNF monitor engine 420 monitors information associated with a VNF, the information including network function virtualization (NFV) infrastructure-specific metrics and VNF-specific metrics in accordance with instructions 120 and 220 of FIGS. 1 and 2, respectively. For instance, VNF monitor engine 420 may query each VNF instance to collect NFV infrastructure-specific metrics and VNF-specific metrics. In some examples in which the VNF is one of a set of VNFs, VNF monitor engine 420 may include a VNF agent for each VNF of the set of VNFs to monitor information associated with each VNF.

Scaling decision engine 440 predicts a resource allocation event for the VNF instance based (at least in part) on the information and a resource flexing model, as described above in relation to instructions 140 and 240 of FIGS. 1 and 2 respectively. Scaling decision engine 440 may pull the monitored information from VNF monitor engine 420 periodically, such as every time window W. The predicted resource allocation event may be an urgent event, a scale event, or a do not scale event.

The resource flexing model is developed offline via a machine-learning technique using training data and a capacity metric for the VNF instance, as described above in relation to instructions 245 of FIG. 2. The training data may include infrastructure-specific metrics and VNF-specific metrics. As described above in relation to instructions 250 of FIG. 2, scaling decision engine 460 may update the resource flexing model during operation based (at least in part) on the monitored information collected during online operation. The resource flexing model may be updated on a periodic basis or based (at least in part) on a trigger, such as a prediction of an urgent scale event. A separate resource flexing model may be generated for each VNF of the set of VNFs or each VNF instance of the set of VNF instances.

Resource flexing engine 460 generates a resource flexing plan based (at least in part) on the resource allocation event. Resource flexing engine 460 may do so in accordance with instructions 160 and 260 of FIGS. 1 and 2, respectively. In some examples, based (at least in part) on a resource allocation event being a do not scale event, resource flexing engine 460 may leave the VNF unaltered in the resource flexing plan. Based (at least in part) on a resource allocation event being a scale event or an urgent scale event, resource flexing engine 460 may redistribute workload among a set of VNF instances of the VNF, scale up the VNF, scale down the VNF, scale in the VNF, or scale out the VNF in the resource flexing plan. Scaling out or in, as used herein, refers to adding or removing a VNF instance. Scaling up or down, as used herein, refers to adding or removing resources from a VNF instance.

In other examples, in which the VNF is one of a set of VNFs, resource flexing engine 460 may also take into consideration an order of the set of VNFs in a service function chain. In such examples, a VNF instance that is not overloaded or close to capacity may nevertheless be scaled or adjusted because of its order in the service function chain. Scale events and urgent scale events in VNF instances late in a service function change may prompt workload redistribution, scaling up, scaling down, scaling in, or scaling out of earlier VNFs in the service function chain.

In some examples, resource flexing engine 460 may determine a scale status of each urgent scale event and scale event to aid in generating the resource flexing plan. A partial scale status may indicate that any overload may be alleviated by redistributing workload among a set of VNF instances of the VNF. A full scale status may indicate that any overload may be alleviated by scaling up, scaling down, scaling in, or scaling out the VNF. In some instances, however, resource flexing engine 460 may recognize that redistribution of the workload may fail to alleviate an overload though a scale status of the scale event may be partial. In such examples, resource flexing engine 460 includes in the resource flexing plan a scaling up, scaling down, scaling in, or scaling out of the VNF.

FIG. 5 depicts a system 500 that includes a VNF monitor engine 520, a scaling decision engine 540, a resource flexing engine 560, and a placement engine 580. Although system 500 is described below with reference to the instructions of FIGS. 1 and 2, system 500 is not limited to such examples. Each engine may be a decoupled module that leverages NFV architecture.

VNF monitor engine 520, scaling decision engine 540, and resource flexing engine 560 may be analogous to similarly named and numbered engines VNF monitor engine 420, scaling decision engine 440, and resource flexing engine 460 of FIG. 4. Placement engine 580 converts the resource flexing plan to executable commands for enforcement by a NFV orchestrator. Placement engine 580 may do so in accordance with instructions 280 of FIG. 2. In some examples, placement engine 580 may also determine how to best place a new VNF instance to reduce costs and processing overhead.

Figure 6:
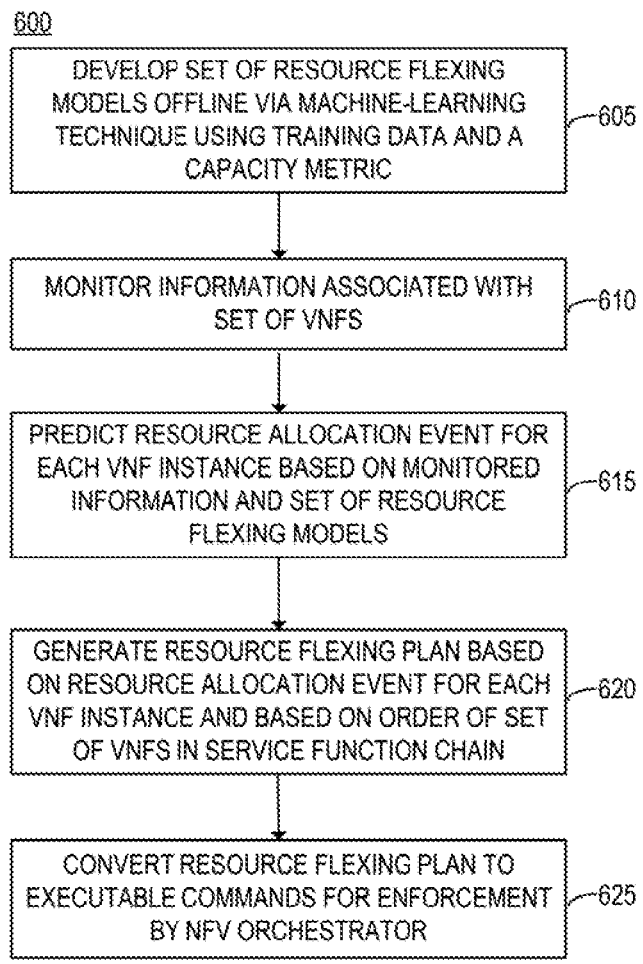
FIG. 6 is a flowchart of an example method for allocating resources to a set of virtual network functions.

FIG. 6 is a flowchart of an example method 600 for allocating resources to a set of VNFs. Although execution of method 600 is described below with reference to the instructions of FIG. 2, method 600 is not limited to such examples (e.g., FIG. 1).

At 605, instructions 245 may develop a resource flexing model offline via a machine-learning technique using training data and a capacity metric, as described above in relation to instructions 245 of FIG. 2. In some examples, an associated resource flexing model may be developed for each VNF of the set of VNFs. The resource flexing models may make up a set of resource flexing models.

At 610, instructions 220 may monitor information associated with the set of VNFs, as described above in relation to instructions 220 of FIG. 2. Each VNF of the set of VNFs may include a set of VNF instances and the monitored information may include NFV infrastructure-specific metrics and VNF-specific metrics. At 615, instructions 240 predict a resource allocation event for each VNF instance based (at least in part) on the monitored information and the set of resource flexing models, as described above in relation to instructions 240 of FIG. 2. For instance, a resource allocation event for a particular VNF instance may be based (at least in part) on the monitored information and the associated resource flexing model for the VNF. The resource allocation event for each VNF instance may make up a set of resource allocation events.

At 620, instructions 260 may generate a resource flexing plan based (at least in part) on the resource allocation event for each VNF instance and based (at least in part) on an order of the set of VNFs in a service function chain, as described above in relation to instructions 260 of FIG. 2. At 625, instructions 280 may convert the resource flexing plan to executable commands for enforcement by a NFV orchestrator, as described above in relation to instructions 280 of FIG. 2.

Although the flowchart of FIG. 6 shows a specific order of performance of certain functionalities, method 600 is not limited to that order. For example, the functionalities shown in succession in the flowchart may be performed in a different order, may be executed concurrently or with partial concurrence, or a combination thereof. In some examples, functionalities described herein in relation to FIG. 6 may be provided in combination with functionalities described herein in relation to any of FIGS. 1-5 and 7A-7C.

Figure 7A:
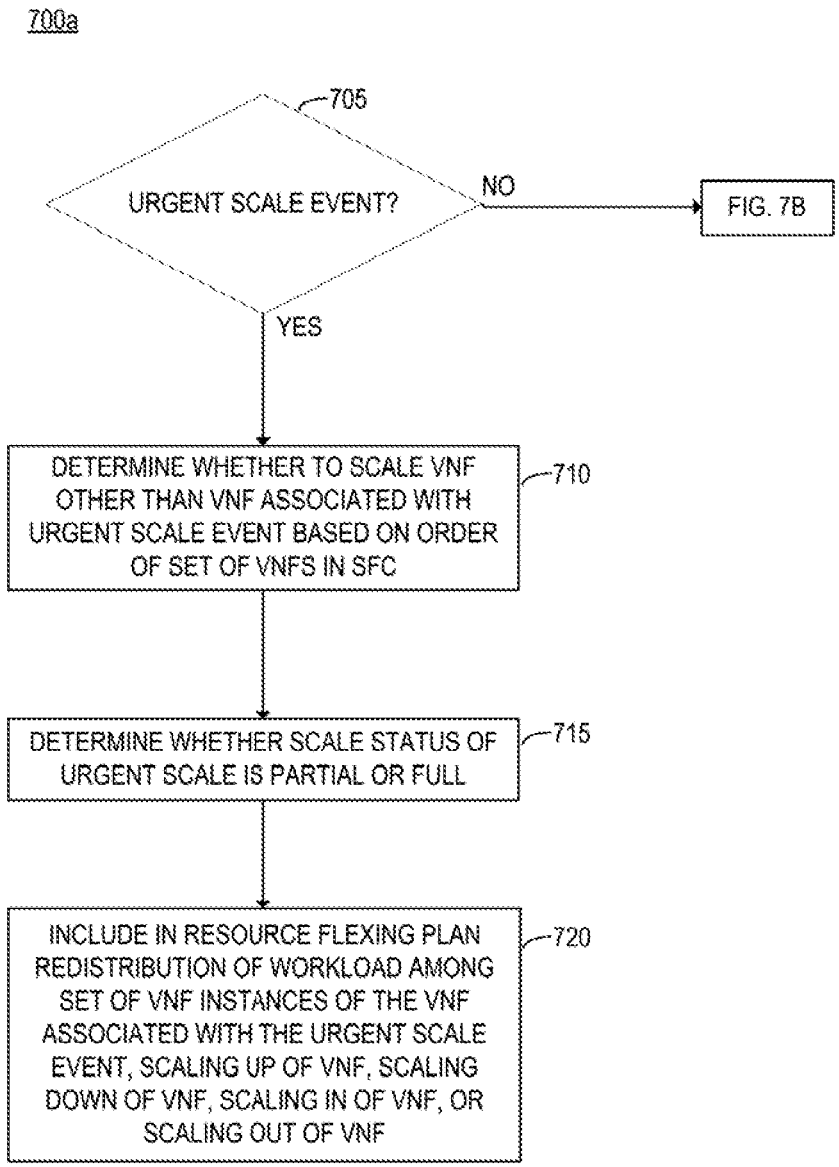
Figure 7C:
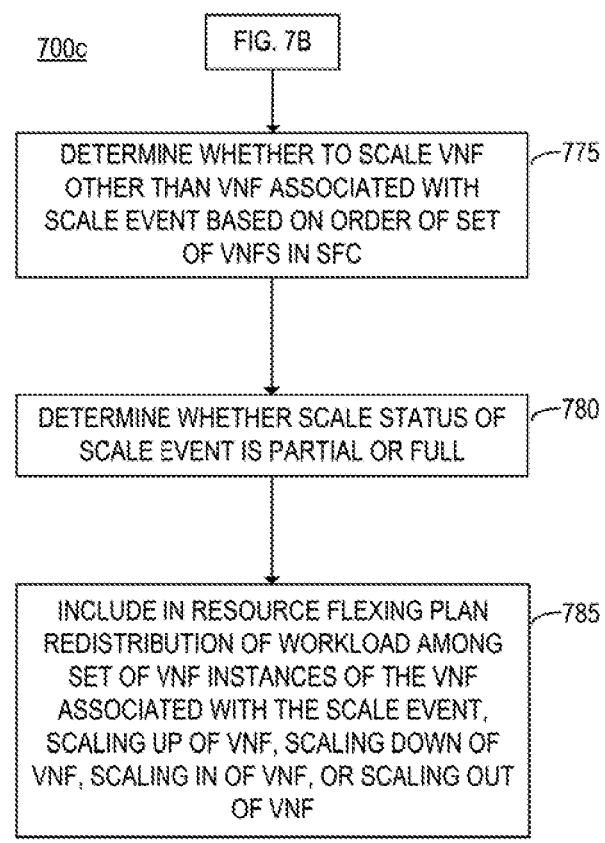

FIGS. 7A-7C are flowcharts of example methods 700*a*, 700*b*, and 700*c*, respectively, to generate a resource flexing plan. Although execution of methods 700*a*, 700*b*, and 700*c* are described below with reference to the instructions of FIG. 3, methods 700*a*, 700*b*, and 700*c* are not limited to such examples.

At 705 of method 700*a*, instructions 361 determine whether the set of resource allocation events includes an urgent scale event, as described above in relation to instructions 361 of FIG. 3. If the set of resource allocation events includes an urgent scale event, method 700*a* proceeds to 710. At 710, instructions 362 determine whether a VNF other than the VNF associated with the urgent scale event should also be scaled based (at least in part) on an order of the set of VNFs in the service function chain, as described above in relation to instructions 362. At 715, a determination is made as to whether the scale status is partial or full. The scale status may be determined by reviewing a predicted resource allocation event of each VNF instance of the VNF associated with the urgent scale event. A partial scale status indicates that a subset of the VNF instances of the VNF associated with the urgent scale are overloaded or in failure. A full scale status indicates that each VNF instance of the VNF associated with the urgent scale is overloaded or in failure.

At 720, in response to determining whether the scale status is partial or full, instructions 363 include in the resource flexing plan a redistribution of workload among the set of VNF instances of the VNF associated with the urgent scale event, a scaling up, a scaling down, a scaling in, or a scaling out of the VNF associated with the urgent scale event, as described above in relation to instructions 363 of FIG. 3.

If the set of resource allocation events does not include an urgent scale event at 705, method 700a proceeds to 730 of method 700b (FIG. 7B). At 730, instructions 364 determine whether the set of resource allocation events includes a scale event, as described above in relation to instructions 364 of FIG. 3. If the set of resource allocation events does not include a scale event, method 700b proceeds to 735. At 735, instructions 370 leave the set of VNFs unaltered, as described above in relation to instructions 370 of FIG. 3.

If the set of resource allocation events does include a scale event, method 700b proceeds to 740. At 740, instructions 365 determine whether the set of resource allocation events includes a plurality of scale events, as described above in relation to instructions 365 of FIG. 3. If a plurality of scale events exist, method 700b proceeds to 745. At 745, instructions 366 determine whether a VNF other than each VNF associated with the plurality of scale events should be scaled based (at least in part) on an order of the set of VNFs in the service function chain, as described above in relation to instructions 366 of FIG. 3. At 750, a determination is made as to whether the scale status is partial or full. The determination may be made with respect to each scale event and, in some examples, the determinations may be made in order of the VNFs in the service function chain.

At 755, in response to determining the scale status is partial or full, instructions 367 include in the resource flexing plan a redistribution of workload among the set of VNF instances of the VNF associated with the scale event, a scaling up, a scaling down, a scaling in, or a scaling out of the VNF associated with the scale event, as described above in relation to instructions 367 of FIG. 3. At 760, a determination is made as to whether another VNF exists that is associated with a scale event. If not, method 700b proceeds to 765 and generation of the resource flexing plan is complete. If however, another VNF associated with one of the plurality of scale events has yet to be included in the resource flexing plan, method 700b returns to 750 to determine whether the scale status of the scale event is partial or full. 750, 755, and 760 may iterate until each VNF associated with a scale event has been included in the resource flexing plan.

If it is determined at 740 that a plurality of scale events do not exist, but that a scale event does exist, method 700b proceeds to 775 of method 700c (FIG. 7C). At 775, instructions 368 determine whether a VNF other than a VNF associated with the scale event should be scaled based (at least in part) on an order of the set of VNFs in the service function chain, as described above in relation to instructions 368 of FIG. 3. At 780, a determination is made as to whether the scale status of the scale event is partial or full. At 785, in response to determining the scale status is partial or full, instructions 369 include in the resource flexing plan a redistribution of workload among the set of VNF instances of the VNF associated with the scale event, a scaling up, a scaling down, a scaling in, or a scaling out of the VNF associated with the scale event, as described above in relation to instructions 369 of FIG. 3.

Although the flowcharts of FIGS. 7A-7C shows a specific order of performance of certain functionalities, methods 700a, 700b, and 700c are not limited to that order. For example, the functionalities shown in succession in the flowcharts may be performed in a different order, may be executed concurrently or with partial concurrence, or a combination thereof. In some examples, functionalities described herein in relation to FIGS. 7A-7C may be provided in combination with functionalities described herein in relation to any of FIGS. 1-6.

What is claimed is:

1. A non-transitory machine-readable storage medium encoded with instructions executable by a processing resource to allocate resources to a set of virtual network functions (VNFs), the machine-readable storage medium comprising instructions to:
   monitor information associated with the set of VNFs that includes a set of VNF instances;
   predict a resource allocation event for a VNF instance based on the monitored information and a resource flexing model that is developed using a capacity metric of the VNF instance indicating a maximum workload at which the VNF instance provides stable service, wherein the resource flexing model comprises an analytical model used to predict an overload of the VNF instance;
   generate a resource flexing plan based on the resource allocation event and an order of the set of VNFs in a service function chain,
   wherein the resource flexing plan evaluates VNF dependency relationships to adjust or scale VNF instances earlier in the service function chain when the VNF instance is later in the service function chain and is overloaded or is predicted to become overloaded; and
   convert the resource flexing plan to executable commands for enforcement by a network function virtualization (NFV) orchestrator.

2. The non-transitory machine-readable medium of claim 1, wherein the information includes network function virtualization (NFV) infrastructure-specific metrics and VNF-specific metrics.

3. The non-transitory machine-readable medium of claim 2:
   wherein the NFV infrastructure-specific metrics include central processing unit (CPU) usage, memory usage, network usage, and virtualization-related metrics;
   wherein the VNF-specific metrics include transaction rate, request rate, processing delay, and queue sizes; and
   wherein the capacity metric is a predetermined workload at which the VNF instance provides stable service.

4. The non-transitory machine-readable medium of claim 1, further comprising instructions to:
   develop the resource flexing model offline via a machine-learning technique using training data and the capacity metric; and
   update the resource flexing model during online operation based on the monitored information.

5. The non-transitory machine-readable medium of claim 1, wherein the instruction to predict a resource allocation event for a VNF instance comprises instructions to predict a resource allocation event for each VNF instance such that the resource allocation event for each VNF instance make up a set of resource allocation events.

6. The non-transitory machine-readable medium of claim 5, wherein the instruction to generate the resource flexing plan comprises instructions to:
   determine whether the set of resource allocation events includes an urgent scale event;
   based on a determination that an urgent scale event exists, determine whether a VNF other than a VNF associated with the urgent scale event should be scaled based on the order of the set of VNFs in the service function chain; and
   include in the resource flexing plan a redistribution of workload among a set of VNF instances of the VNF associated with the urgent scale event, a change in resources allocated to the VNF associated with the urgent scale event, or a change in a number of VNF instances of the VNF associated with the urgent scale event.

7. The non-transitory machine-readable medium of claim 6, wherein the instruction to generate the resource flexing plan further comprises instructions to:
   based on a determination that an urgent scale event does not exist, determine whether the set of resource allocation events includes a scale event;
   based on a determination that a scale event exists, determine whether a plurality of scale events exist;
   based on a determination that a plurality of scale events exist, determine whether a VNF other than those associated with the plurality of scale events should be scaled based on the order of the set of VNFs in the service function chain; and
   for each scale event, include in the resource flexing plan a redistribution of workload among a set of VNF instances of the VNF associated with the scale event, a change in resources allocated to the VNF associated with the scale event, or a change in a number of VNF instances of the VNF associated with the scale event.

8. The non-transitory machine-readable medium of claim 7, wherein the instruction to generate the resource flexing plan further comprises instructions to:
   based on a determination that a plurality of scale events does not exist, determine whether a VNF other than a VNF associated with the scale event should be scaled based on the order of the set of VNFs in the service function chain;
   include in the resource flexing plan a redistribution of workload among a set of VNF instances of the VNF associated with the scale event, a change in resources allocated to the VNF associated with the scale event, or a change in a number of VNF instances of the VNF associated with the scale event; and
   based on a determination that a scale event does not exist, leave the set of VNFs unaltered.

9. A system to allocate resources to a virtual network function (VNF), the system comprising:
   a processing resource;
   a non-transitory machine-readable medium coupled to the processing resource, the non-transitory machine-readable medium including executable instructions that, when executed by the processing resource, cause the processing resource to:
   monitor information associated with a VNF, the information including network function virtualization (NFV) infrastructure-specific metrics and VNF-specific metrics;
   predict a resource allocation event for a VNF instance of the VNF based on the monitored information and a resource flexing model, the resource flexing model comprising an analytical model used to predict an overload of the VNF instance, and being developed offline via a machine-learning technique using training data and a capacity metric for the VNF instance indicating a maximum workload at which the VNF instance provides stable service;
   generate a resource flexing plan based on the resource allocation event and an order of a set of VNFs in a service function chain,
   wherein the resource flexing plan evaluates VNF dependency relationships to adjust or scale VNF instances earlier in the service function chain when the VNF instance is later in the service function chain and is overloaded or is predicted to become overloaded; and
   convert the resource flexing plan to executable commands for enforcement by a network function virtualization (NFV) orchestrator.

10. The system of claim 9, the system further comprising a VNF agent for each VNF of the set of VNFs to monitor the information associated with each VNF.

11. The system of claim 9:
   wherein the training data includes infrastructure-specific metrics and VNF-specific metrics; and
   wherein the scaling decision engine updates the resource flexing model during online operation based on the monitored information.

12. The system of claim 9, wherein the resource allocation event is an urgent event, a scale event, or a do not scale event.

13. The system of claim 9, wherein the resource flexing plan includes redistribution of workload among a set of VNF instances of the VNF, scaling up the VNF, scaling down the VNF, scaling in the VNF, or scaling out the VNF, based on status of the resource allocation event.

14. A method of allocating resources to a set of virtual network functions (VNFs), the method comprising:
   developing a set of resource flexing models offline via a machine-learning technique using training data and a capacity metric indicating a maximum workload at which a VNF instance provides stable service, the set of resource flexing models comprising analytical models used to predict overloading of VNF instances, and including an associated resource flexing model for each VNF of the set of VNFs;
   monitoring information associated with the set of VNFs, each VNF of the set of VNFs including a set of VNF instances and the information including network function virtualization (NFV) infrastructure-specific metrics and VNF-specific metrics;
   predicting a resource allocation event for each VNF instance based on the monitored information and the set of resource flexing models such that a set of resource allocation events includes the resource allocation event for each VNF instance;
   generating a resource flexing plan based on the resource allocation event for each VNF instance and based on an order of the set of VNFs in a service function chain, wherein the resource flexing plan evaluates VNF dependency relationships to adjust or scale VNF instances earlier in the service function chain when the VNF instance is later in the service function chain and is overloaded or is predicted to become overloaded; and
   converting the resource flexing plan to executable commands for enforcement by a NFV orchestrator.

15. The method of claim 14, wherein generating the resource flexing plan further comprises:
   determining whether the set of resource allocation events includes an urgent scale event;
   based on a determination that an urgent scale event exists, determining whether a VNF other than a VNF associated with the urgent scale event should be scaled based on the order of the set of VNFs in the service function chain;
   determining whether a scale status of the urgent scale event is partial or full; and
   in response to determining the scale status is partial or full, including in the resource flexing plan a redistribution of workload among the set of VNF instances of the VNF associated with the urgent scale event, a scaling up, a scaling down, a scaling in, or a scaling out of the VNF associated with the urgent scale event.

16. The method of claim 15, wherein generating the resource flexing plan further comprises:
based on a determination that an urgent scale event does not exist, determining whether the set of resource allocation events includes a scale event;
based on a determination that a scale event exists, determining whether a plurality of scale events exist;
based on a determination that a plurality of scale events exist, determining whether a VNF other than each VNF associated with the plurality of scale events should be scaled based on the order of the set of VNFs in the service function chain;
based on the order, determining, for each scale event, whether a scale status of the scale event is partial or full; and
in response to determining the scale status is partial or full, for each scale event, including in the resource flexing plan a redistribution of workload among the set of VNF instances of the VNF associated with the scale event, a scaling up, a scaling down, a scaling in, or a scaling out of the VNF associated with the scale event.

17. The method of claim 16, wherein generating the resource flexing plan further comprises:
based on a determination that a plurality of scale events does not exist, determining whether a VNF other than a VNF associated with the scale event should be scaled based on the order of the set of VNFs in the service function chain;
determining whether the scale status of the scale event is partial or full; and
in response to determining the scale status is partial or full, including in the resource flexing plan a redistribution of workload among the set of VNF instances of the VNF associated with the scale event, a scaling up, a scaling down, a scaling in, or a scaling out of the VNF associated with the scale event.

* * * * *